Dec. 9, 1924.
G. H. GIBSON
1,518,784
METHOD AND APPARATUS FOR PURIFYING WATER
Original Filed April 13, 1921   2 Sheets-Sheet 1
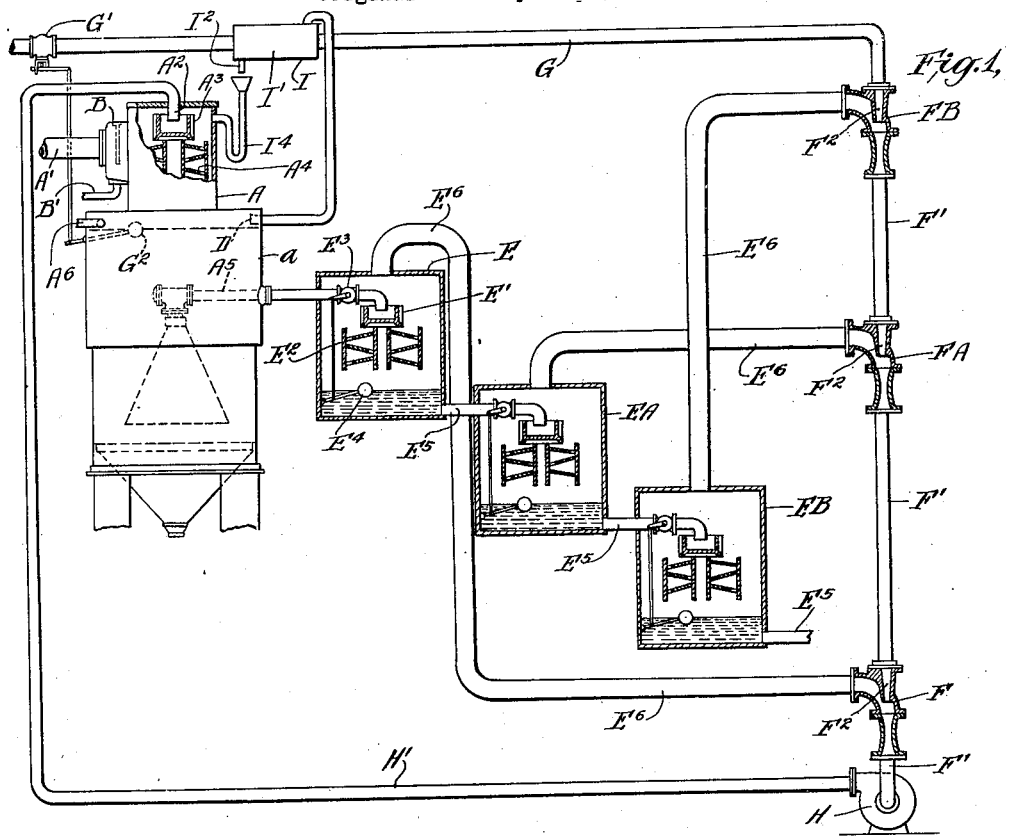
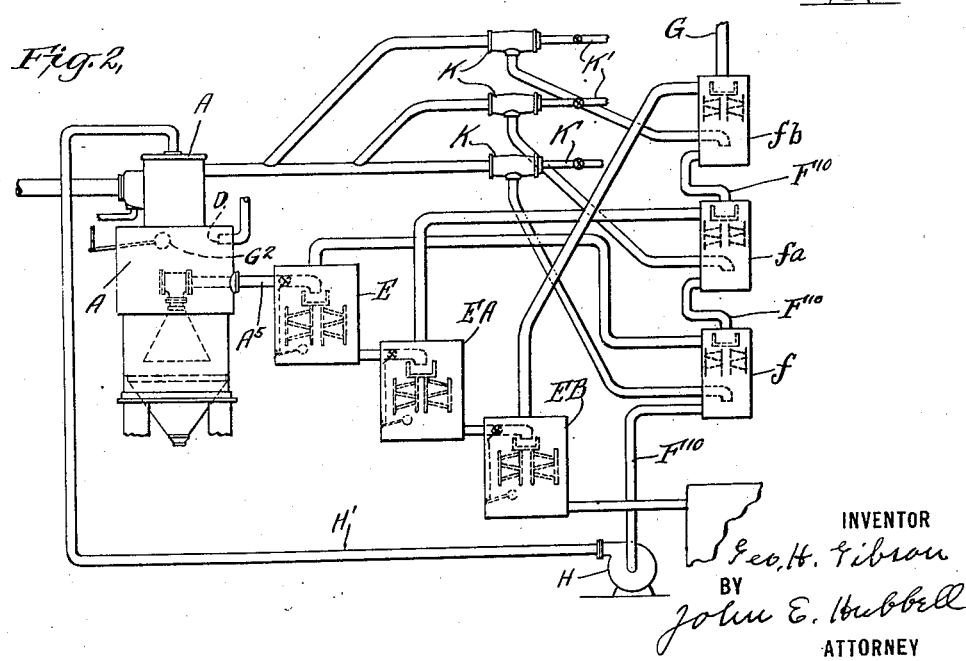
INVENTOR
Geo. H. Gibson
BY
John E. Hubbell
ATTORNEY Dec. 9, 1924.
G. H. GIBSON
METHOD AND APPARATUS FOR PURIFYING WATER
Original Filed April 13, 1921    2 Sheets-Sheet 2
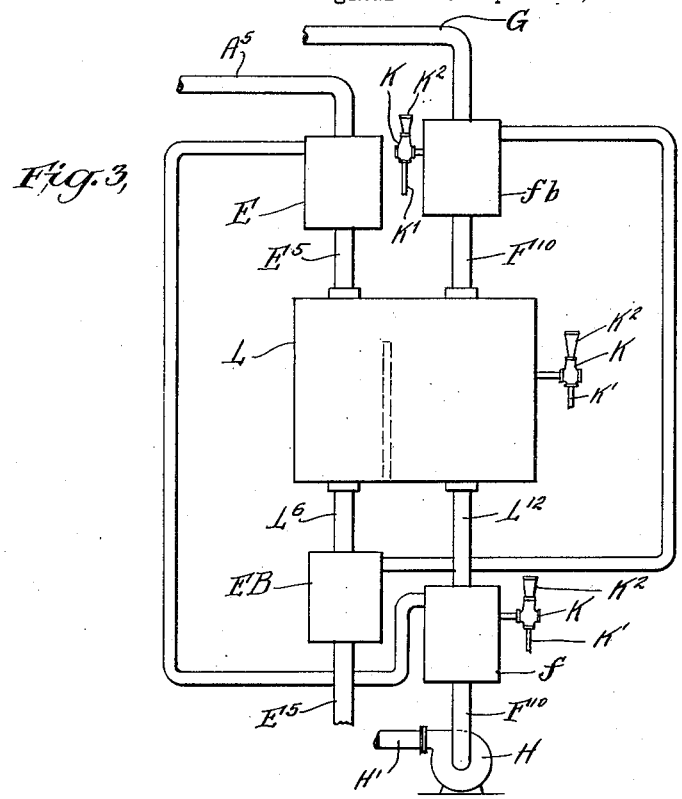
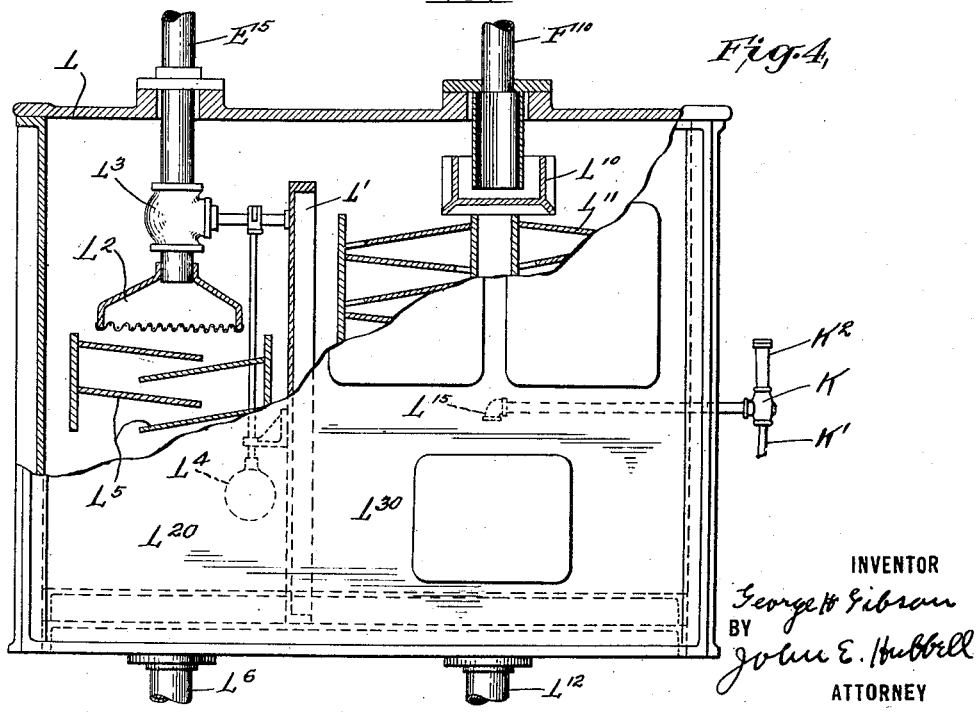
INVENTOR
George H. Gibson
BY
John E. Hubbell
ATTORNEY Patented Dec. 9, 1924.

1,518,784

UNITED STATES PATENT OFFICE.

GEORGE HERBERT GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA.

METHOD AND APPARATUS FOR PURIFYING WATER.

Application filed April 13, 1921, Serial No. 461,075. Renewed July 15, 1924.

*To all whom it may concern:*

Be it known that I, GEORGE H. GIBSON, a citizen of the United States, and resident of Montclair, in the county of Essex and State of New Jersey, have invented certain new and useful Improvements in Methods and Apparatus for Purifying Water, of which the following is a specification.

My present invention relates to the purification of water by methods involving the heating of the water, in one stage of the operation, to a temperature of or in the neighborhood of 212° F., and the general object of the invention is to provide an improved method of and apparatus for the purpose specified which will make possible the delivery of the purified water at a temperature appreciably below 212° F. without waste of the heat required to bring the water to the higher temperature.

The invention is of especial utility in the softening of water by processes involving the heating of water to, or approximately to the boiling point at atmospheric pressure with or without the addition of chemical purifying reagents and as thus used is characterized not only by the relatively small amount of heat required but also by the effective elimination of air dissolved in the water and indeed the invention may sometimes be used with advantage where deaeration is the only purification of the water required.

In carrying out the invention the water after being heated to a temperature of, or in the neighborhood of 212° F. is cooled by reducing the pressure of the water in a plurality of successive stages to a pressure substantially below that of the atmosphere. At each stage in the pressure reducing operation a portion of the water is vaporized, the necessary heat of evaporation being furnished by the unvaporized water residue which is correspondingly cooled. The water vapor generated from the water in the pressure reducing and cooling operation is condensed in suitable condensing apparatus, preferably of the contact or jet condenser type, as distinguished from the surface condenser type, by the raw water which with the condensate thereby added to it is passed to the initial heating apparatus. Air mixed with the vapor passing to the condensers may be withdrawn from the condensers by suitable ejectors or air pumps, or in some cases, may be entrained by the cooling water and water of condensation and passed with the latter to the initial heating apparatus. Preferably the water is initially heated in a heater of the open feed water heater type having an outlet for the discharge to the atmosphere of the air liberated in the heater.

By proceeding as specified it is possible to heat and purify the water with relatively simple apparatus from which the water is delivered at a temperature much below that to which it is heated in the initial heating apparatus without any appreciable loss of heat except the small loss resulting from radiation. The initial heating apparatus may well be associated with or form a part of a so-called hot process water softening and purifying system and in this case the water delivered from the apparatus is not only deaerated but is also a sterilized and purified product especially well adapted for use in the manufacture of ice, though of course the treated water is suitable for other uses when pure deaerated water is required or desirable. Preferably there is an individual condenser for each expansion chamber and the different condensers are so connected in series that the condensing water flows through the series in the reverse order to that in which the water flows through the expansion chambers to which the condensers are respectively connected.

The various features of novelty which characterize my invention are pointed out with particularity in the claims annexed to and forming a part of this specification. For a better understanding of the invention, however, its advantages and specific objects attained with it, reference should be had to the accompanying drawings and descriptive matter in which I have diagrammatically illustrated and described preferred forms of apparatus embodying my invention.

Of the drawings:

Fig. 1 is a diagrammatic representation of one form of water deaerating and purifying apparatus;

Fig. 2 is a similar view illustrating a somewhat modified form of apparatus;

Fig. 3 is a diagrammatic representation of a portion of a modified form of apparatus; and Fig. 4 is an elevation partly broken away and in section of a portion of the apparatus shown in Fig. 3.

In the drawings, and referring first to the construction shown in Fig. 1, A represents a water heater of the open feed water type, which is mounted above and is open at its lower end to a decanting tank or settling chamber such as is employed in the so-called hot process of water purification. $A^2$ represents the water inlet to the top of the heater, and $A^1$ the pipe supplying steam to the heater. The water entering the heater at the inlet $A^2$ passes through a distributing trough $A^3$ and thence on to the usual splash trays $A^4$, over which the water flows in film-like and broken streams. $A^5$ represents the water outlet from the tank $a$. $A^6$ is an overflow connection from the chamber A, and B represents the usual oil separator in the steam line.

The water outlet pipe $A^5$ discharges into an expansion chamber E, advantageously provided with a distributing trough $E'$ and splash trays $E^2$, whereby the water is caused to flow through the upper portion of the expansion chamber E in film-like and broken streams. The supply of water through pipe $A^5$ to the chamber E is controlled by a valve $E^3$ in the pipe $A^5$ and a float $E^4$. Advantageously the valve $E^3$ and the connections between it and the float $E^4$ are all arranged within the chamber E to avoid air leakage and stuffing box troubles. The water outlet $E^5$ from the chamber E leads to a chamber EA which may be identical in construction and in the arrangement of its parts with the chamber E, and the water outlet $E^5$ from the chamber EA leads to a chamber EB which may be similar in construction and arrangement of its parts to the chambers E and EA.

While Fig. 1 shows three expansion chambers, E, EA and EB, it is to be understood that there may be only two or more such chambers depending on the conditions of use. From the water outlet $E^5$ of the final expansion chamber EB in Fig. 1 the water may pass directly to the place of use or to a filter, or other apparatus not shown, for further treatment. Each of the expansion chambers E, EA and EB is provided with an air and vapor outlet $E^6$ which is connected to a corresponding condenser. As shown in Fig. 1, the air and vapor pipe $E^6$ from the final expansion chamber EB leads to a jet condenser FB, the cold water jet nozzle $F^2$ of which is supplied with water from the cold raw water supply pipe G. The condenser FB is provided with a barometric discharge column $F'$ which delivers the raw water and condensate and entrained air from the condenser FB into the water inlet nozzle $F^2$ of a condenser FA similar to the condenser FB. The air and vapor pipe $E^6$ from the expansion chamber EA is connected to the mixing chamber of the condenser FA. The barometric column discharge connection $F'$ from the condenser FA delivers the water and entrained air in turn to the nozzle $F^2$ of a condenser F similar to the condensers FA and FB. The air and vapor pipe from the expansion chamber E is connected to the vapor inlet of the condenser F. The barometric column discharge connection $F'$ from the condenser F leads to the inlet of a pump H which discharges the water and entrained air through pipe $H'$ to the water inlet $A^2$ of the heater A.

The height of water level in the tank $a$ is controlled by a float $G^2$ and connections from it to a throttle valve $G'$ in the raw water supply pipe G. The tank $a$ is provided with an air outlet D leading to a gleaner or condensing space $I'$ provided between a jacket I and a section of the pipe G surrounded by this jacket. The space $I'$ is provided with an outlet $I^2$ for air and water of condensation, and the condensate dripping from the outlet $I^2$ enters a return pipe $I^4$ formed with a depending loop to provide a water seal which discharges into the heater A.

In the contemplated mode of operation of the apparatus shown in Fig. 1 the water is heated to a temperature in the neighborhood of, or above 212° in the heater A. Under these conditions the bulk of the air and free gases dissolved in the water entering the heater is liberated in the latter, and this air and gas and other gas liberated in the heater or from the surface of the water in the tank $a$ as a result of chemical reagents added to the water in the heater A or in the tank $a$, passes out of the heater through the outlet D and eventually escapes to the atmosphere, since the pressure within the heater A is at or above that of the atmosphere. This air carries with it a certain amount of vapor, which is condensed in the space $I'$ without loss of heat to the system, and the condensate formed in the space $I'$ is returned to the heater.

A portion of the water entering the expansion chamber E through the connection $A^5$ is evaporated therein as a result of the reduced pressure maintained therein, the necessary heat of evaporation being furnished by the unvaporized water which is correspondingly reduced in temperature. In the chambers EA and EB successively lower pressures are maintained and a partial evaporation of the water supplied to each occurs with a consequent reduction in temperature. In each expansion chamber the evaporation of a portion of the water in its passage in film-like and broken streams through the upper portion of the chamber facilitates the separation of a large part of any air contained in the water entering the chamber. The air thus liberated and the vapor generated in each expansion chamber escapes through the corresponding air and vapor outlet connection $E^6$. In each condenser the vapor entering the condenser is condensed, and the condensing water supplied to the condenser and the condensate formed therein entrains and carries out of the condenser the air entering the condenser with the vapor.

By the operation of the apparatus disclosed in Fig. 1 in the manner described it is possible to very effectually deaerate and sterilize the water treated with relatively simple and reliable apparatus without waste of heat. The temperatures and pressures employed will depend of course upon the proportions and arrangement of the parts and the conditions of operation. In one contemplated arrangement of apparatus of the type shown in Fig. 1, the temperatures expected are approximately as follows: in tank $a$ 210° F.; in chamber E 174° F.; in chamber EA 138° F.; in chamber EB 101° F.; in pipe G 50° F.; and in the outlets F' from the condensers FB, FA and F 86°, 123° and 159° respectively.

To effectively entrain the air in the water and condensate issuing from a jet condenser of the character of the condensers F, FA and FB shown in Fig. 1, there must be a difference in temperature between the water leaving the condenser and the steam or vapor entering it of some 13 to 15°. This result can be obtained, as indicated by the temperatures stated above, where conditions require only a moderate cooling of the water leaving the expansion chamber. Where, as in ice manufacture, a lower final water temperature is desirable, I replace the jet injector condensers of Fig. 1 with other forms of condensing apparatus as shown for example in Fig. 2.

The apparatus shown in Fig. 2 differs primarily from that shown in Fig. 1 in the replacement of the three condensers FB, FA and F of Fig. 1 by condensers $fb$, $fa$ and $f$ of a somewhat different type. As shown the condensers $fb$, $fa$ and $f$ are similar to one another and are practically identical in construction and arrangement with the expansion chambers E, EA and EB except that the condensers are not provided with water inlet valves and controlling floats similar to valves $E^3$ and floats $E^4$ of the expansion chambers. The raw water supply pipe G discharges into the upper end of the condenser $fb$. The water outlet $F^{10}$ from the condenser $fb$ leads to the water inlet of the condenser $fa$. The water outlet $F^{10}$ from the condenser $fa$ leads to the water inlet of the condenser $f$. The water outlet $F^{10}$ from the condenser $f$ leads to the pump H. Each of the condensers $f$, $fa$ and $fb$ is provided with an air and vapor outlet $F^{15}$ connected to a corresponding ejector K. Each ejector K is provided with a steam supply connection K' and with a discharge connection $K^2$ which leads to the heater A.

With the apparatus shown in Fig. 2 the temperature in each expansion chamber can be approximately as low as the temperature of the water leaving the corresponding condenser and in consequence the deaerated water may be withdrawn from the apparatus of the type shown in Fig. 2 at a temperature 13 to 15° F. lower than is obtainable with the apparatus of Fig. 1.

In Figs. 3 and 4 I have diagrammatically illustrated a modification in which a device L which I call an open heat exchanger replaces the intermediate expansion chamber EA and the intermediate condenser $fa$ of Fig. 2. The heat exchanger L comprises a chamber having its lower portion divided into two water receiving compartments $L^{20}$ and $L^{30}$ by a partition L' which terminates below the top of the chamber so that the upper portions of the compartments $L^{20}$ and $L^{30}$ are in free communication with one another over the top of partition L'. The water leaving the expansion chamber E through the corresponding discharge pipe $E^5$ is discharged in film-like and broken streams into the compartment $L^{20}$. As shown the water is discharged through a spray head $L^2$ on to baffles $L^5$. The flow of water to the spray head $L^2$ is controlled by a valve $L^3$ and float $L^4$ so as to maintain an approximately constant water level in the compartment $L^{20}$. The water leaves the compartment $L^{20}$ through the outlet $L^6$ which runs to the water inlet of the expansion chamber EB. The water leaving the condenser $fb$ through its discharge pipe $F^{10}$ is discharged in film-like and broken streams into the upper portion of the compartment $L^{30}$. As shown, the film-like and broken stream flow is obtained by means of a distributing trough $L^{10}$ and trays or baffles $L^{11}$. The water is discharged from the compartment $L^{30}$ through the outlet connection $L^{12}$ running to the condenser $f$. The air is withdrawn from the device L through an air outlet $L^{15}$ connected to an ejector K discharging into the heater A. In the operation of the apparatus shown in Figs. 3 and 4, the heat exchanger L performs the double function of an expansion chamber in which steam is generated and also of a condensing chamber in which the steam generated is condensed.

In the heat exchanger L, as in the other condensers shown in Figs. 1 and 2, the condenser cooling water gives up a portion of its air content as a result of the reduction in pressure and increase in temperature to which the cooling water is subjected in passing through the condenser. This air as well as the air from the water which is being cooled is withdrawn from each condensing chamber by the corresponding ejector. The heat exchanger L is capable of use in other relations than that illustrated herein and embodies features of novelty which are claimed in my application, Serial No. 523,548, filed December 19, 1921, as a division of this application.

In my co-pending application, Serial No. 461,074, filed of even date herewith, I have generically claimed certain novel subject matter disclosed in common by that application and this case. It is possible, as is pointed out in my other application referred to, to effectively deaerate water with apparatus differing specifically from that disclosed herein in that but a single expansion chamber with corresponding condensing provisions are employed for liberating the air contained in the water leaving the heater and for cooling this water. The use of a plurality of expansion chambers in which the pressure of the water leaving the heater is successively cooled, specifically claimed herein, makes possible in practice the delivery of purified water at a somewhat lower temperature and with a smaller air content than can be secured where the total expansion and cooling of the water being purified occurs in a single stage. While the apparatus required for expanding and cooling the water in successive stages comprises a greater number of units than are needed when the water is expanded and cooled in a single stage, this is compensated for in part by the fact that the process may be carried on with a smaller supply of steam to the heater A.

By the term "air" as used herein I mean to include not only atmospheric air and its constituents but other gases liberated from the water as a result of the addition thereto as in the heater A of chemical purifying reagents, as well as by the temperature and pressure conditions to which the water is subjected. The effective elimination of air and other impurities and the relatively low temperature at which the deaerated and purified water is delivered makes the invention claimed herein of especial utility in preparing water for ice manufacture, but the invention may be employed wherever deaerated, sterilized and purified water is required or desired at a temperature appreciably below 212° F. In particular the invention is well adapted for use in treating boiler feed water which is to be passed through an econimizer in which the corrosive action of air-containing water is especially deleterious when the economizer tubes are made of steel or wrought iron.

While in accordance with the provisions of the statutes, I have illustrated and described the best forms of apparatus embodying my invention now known to me, it will be apparent to those skilled in the art that changes may be made in the form of apparatus and in the methods of operation described in detail without departing from the spirit of my invention as set forth in the appended claims, and that certain features of my invention may sometimes be used to advantage without a corresponding use of other features.

Having now described my invention, what I claim as new and desire to secure by Letters Patent, is:

1. The method of purifying water which consists in heating water to a temperature approximating 212° in a heater and then cooling the water by reducing its pressure in successive stages to a pressure appreciably below that of the atmosphere, and condensing the vapor generated on each reduction in pressure by direct contact with the raw water to be deaerated and passing the raw water with its condensate to said heater.

2. The method of purifying water which consists in heating water to a temperature approximating 212° in a heater and then cooling the water by reducing its pressure in successive stages to a pressure appreciably below that of the atmosphere, and condensing the vapors generated in the successive reductions in pressure by mixing the vapor from the final expansion stage with the raw water to be deaerated and mixing the vapor from each preceding expansion stage with the raw water and condensate added thereto by the vapors previously condensed by said raw water, and finally passing the raw water and condensate added to it to said heater.

3. The method of purifying water which consists in heating water to a temperature approximating 212° in a heater having an air and vapor space in which a pressure approximately equal to that of the atmosphere is maintained, discharging the liberated air from the heater, withdrawing water from the heater and reducing its pressure in successive stages to a pressure appreciably below that of the atmosphere, separating the vapor generated and the air liberated on each reduction in pressure from the unvaporized water and condensing said vapor by direct contact with the raw water to be purified and passing the raw water with its condensate addition to said heater.

4. The method of purifying water which consists in heating water to a temperature approximating 212° in a heater having an air and vapor space in which a pressure approximately equal to that of the atmosphere is maintained, withdrawing the liberated air from the heater, withdrawing water from the heater and reducing its pressure in successive stages to a pressure appreciably below that of the atmosphere, separating the vapor generated and the air liberated on each reduction in pressure from the unvaporized water, and condensing the vapor generated in the successive reductions in pressure by mixing the vapor from the final expansion stage with the raw water to be purified and mixing the vapor from each preceding expansion stage with the raw water and condensate added thereto by the vapors previously condensed by said raw water, and finally passing the raw water and condensate added to it into said heater.

5. Apparatus for purifying water comprising in combination a heater having a water inlet and a water outlet, a series of expansion chambers through which water passes successively from the water outlet of the heater, a series of contact condensers with vapor connections from the expansion chambers to the condensers, provisions for passing the raw water to be purified successively through the different condensers in reverse order to the water flow through the expansion chambers to which the expansion chambers are respectively connected and for passing the raw water with its condensate addition from the condensers into the heater.

6. Apparatus for purifying water comprising in combination a water heater, a series of expansion chambers in which successively lower pressures and temperatures are maintained through which the heated water issuing from the heater is successively passed, contact condensing apparatus to which the vapors generated in the expansion chambers are passed, and provisions for passing the raw water to be purified through said condensing apparatus and for passing the raw water with its condensate addition from the condensing apparatus to the heater.

7. Apparatus for purifying water comprising in combination a water heater, a heat exchanger comprising two water compartments in open communication at their upper ends, means for passing the heated water from the heater into one of said compartments, means for passing the raw water to be heated in the other of said compartments, means for withdrawing from the last mentioned compartment the raw water and condensate received therein and passing it to the heater, and means for withdrawing air from the said exchanger.

8. Apparatus for purifying water comprising in combination a chamber provided with partitions dividing it internally into two water receiving compartments in communication with one another at their upper ends, two water inlets, one opening the upper portion of each compartment, a separate water outlet from each compartment, an air exhausting connection to said chamber, and means for maintaining an approximately constant proportion between the quantities of water passed into the two compartments of said chamber.

9. Apparatus for purifying water comprising in combination a water heater and an expansion and condensing chamber divided internally into two water receiving compartments in communication at their upper ends, means for passing water from the heater to said chamber and discharging it into the upper end of one of the compartments, an outlet for water opening from the last mentioned compartment, means for passing the raw water to be purified into the upper end of the other compartment, means for withdrawing water from the last mentioned compartment, and passing it to the heater, and an air exhauster connected to said chamber.

10. Apparatus for purifying water comprising in combination a water heater and an expansion and condensing chamber divided internally into two water receiving compartments in communication at their upper ends, means for passing water from the heater to said chamber and discharging it into the upper end of one of the compartments, an outlet for water opening from the last mentioned compartment, means for passing the raw water to be purified into the upper end of the other compartment, means for withdrawing water from the last mentioned compartment and passing it to the heater, an air exhauster connected to said chamber, and means for maintaining an approximately constant proportion between the quantities of water passed into the two compartments of said chamber.

11. Apparatus for purifying water comprising in combination a heater of the open feed water type having a water inlet and a water outlet, and having provisions for maintaining an air and vapor space therein and for supplying steam to and withdrawing air from said space, a series of expansion chambers through which water passes successively from the water outlet of the heater, a series of contact condensers with vapor connections from the expansion chambers to the condensers, provisions for passing the raw water to be purified successively through the different condensers in reverse order to the water flow through the expansion chambers to which the expansion chambers are respectively connected and for passing the raw water with its condensate addition from the condensers into the heater.

12. Apparatus for purifying water comprising in combination a water heater and provisions for eliminating air liberated from the water heated in said heater, a series of expansion chambers in which successively lower pressures and temperatures are maintained through which the heated water issuing from the heater is successively passed, contact condensing apparatus to which the vapors generated in the expansion chambers are passed, and provisions for passing the raw water to be purified through said condensing apparatus and for passing the raw water with its condensate addition from the condensing apparatus to the heater.

13. Apparatus for purifying water comprising in combination a water heater of the open feed water type provided with an air vent and provisions for supplying steam to the heater to maintain approximately atmospheric pressure therein, a heat exchanger comprising two water compartments in open communication at their upper ends, means for passing the heated water from the heater into one of said compartments, means for passing the raw water to be heated in the other of said compartments, means for withdrawing from the last mentioned compartment the raw water and condensate received therein and passing it to the heater, and means for withdrawing air from the said exchanger.

Signed at Philadelphia, in the county of Philadelphia, and State of Pennsylvania, this eighth day of April, A. D. 1921.

GEORGE HERBERT GIBSON.